April 17, 1951     W. P. SCHULTZ     2,549,245
CLUTCH AND BRAKE FOR POWER TRANSMITTING MECHANISMS
Filed May 9, 1947     2 Sheets-Sheet 1

INVENTOR.
Walter P. Schultz
BY Frank C. Karman
ATTORNEY

April 17, 1951        W. P. SCHULTZ        2,549,245

CLUTCH AND BRAKE FOR POWER TRANSMITTING MECHANISMS

Filed May 9, 1947        2 Sheets-Sheet 2

INVENTOR.
Walter P. Schultz
BY Frank C. Fearman.
ATTORNEY

Patented Apr. 17, 1951

2,549,245

UNITED STATES PATENT OFFICE 2,549,245

CLUTCH AND BRAKE FOR POWER-TRANSMITTING MECHANISMS

Walter P. Schultz, Saginaw, Mich.

Application May 9, 1947, Serial No. 747,021

3 Claims. (Cl. 192—18)

1

This invention relates to treadle-controlled power transmitting mechanism such as is used on sewing machine power tables to enable the individual operator to readily control the start, stop and speed of the respective sewing machine which is driven from a line shaft usually running parallel of the power table.

One of the prime objects of the invention is to design a power transmitting mechanism of the type in question which is of simple, substantial and inexpensive construction, and which may be easily operated with a minimum effort by the operator.

Another object is to provide a power transmitting mechanism which can be easily mounted, which can be readily assembled and disassembled, and which is adjustable to different levels to permit alignment of clutch assembly and motor and to accommodate different size motor frames.

A further object is to design a power transmitting mechanism including a clutch and driving motor, and means associated therewith for quickly stopping rotation of the mechanism or machine to which it is attached.

A further object is to design a compact power transmitting mechanism composed of few parts, all of which are of sturdy construction and design.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

Figure 1:
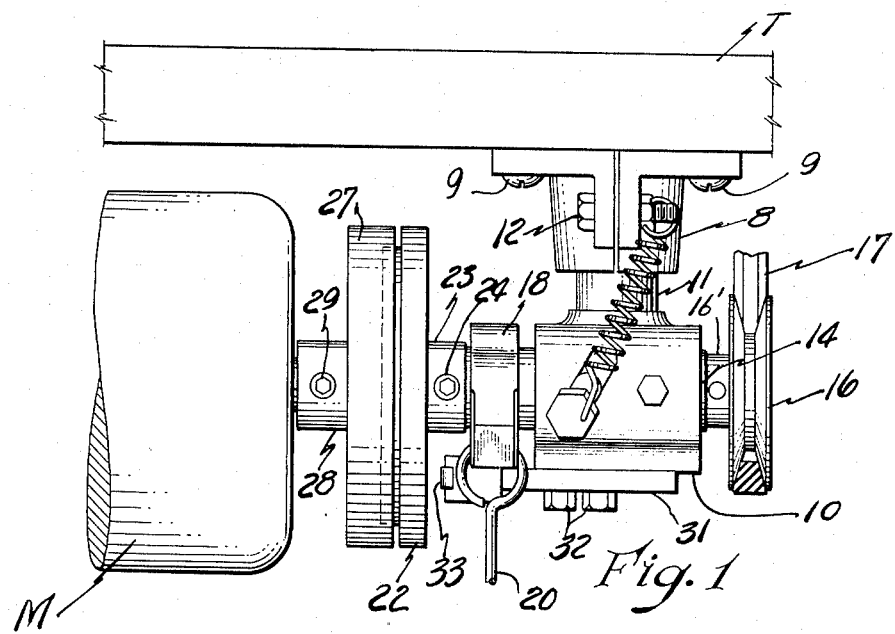
Fig. 1 is a side-elevational view of a sewing machine table showing my power transmitting mechanism mounted thereon and operatively connected to a motor clutch in engaged position.

Referring now more specifically to the drawings in which I have shown the preferred embodiment of my invention, the letter "T" indicates the sewing machine table on which a sewing machine (not shown) is mounted. Mounted on the under side of the table T is a split hub 8 which is secured in position by means of bolts 9 or the like, a clutch supporting member 10 is suspended in the hub 8, and is formed with a post 11 which is received in the hub, and a bolt 12 serves to securely clamp the post in the hub, said post being raised or lowered to accommodate different size motor frames.

The member 10 is centrally bored as at 13 and accommodates the sleeve 14 in which a shaft 15 is journaled, a sheave 16, having its hub 16' mounted on the one end of the shaft, and a belt 17 is trained thereover and leads to the sewing machine (not shown) provided on the table.

A split thrust arm 18 is fixedly mounted on the sleeve 14 directly adjacent the member 10, and is clamped in position thereon by means of a bolt 19, a link 20 being connected to the free end of said arm, and the lower end of the link is connected to one end of the treadle L which is pivotally mounted at the point 21.

A clutch plate 22 is mounted on the other end of the shaft 15, said plate being formed with a hub 23, and a setscrew 24 serves to secure it in position, a clutch lining 25 being mounted on the face of said plate and drivingly engages a lining mounted on a face plate 27, which plate is also formed with a hub 28, and a screw 29 serves to secure it on the motor shaft which is driven from the motor M. Thus, the sleeve 14 is arranged on the shaft 15 with its ends in thrust engagement with the hubs 16' and 23 of the sheave 16 and disk 22 respectively, such that relative rotational movement is permitted but relative endwise movement is prevented.

A bracket 31 is adjustably secured to the lower face of the supporting member 10 by means of screws 32, and a strip of brake lining 33 is mounted in the one face of said bracket for engagement with one side of the clutch plate 22 when the motor is disconnected.

Figure 3:
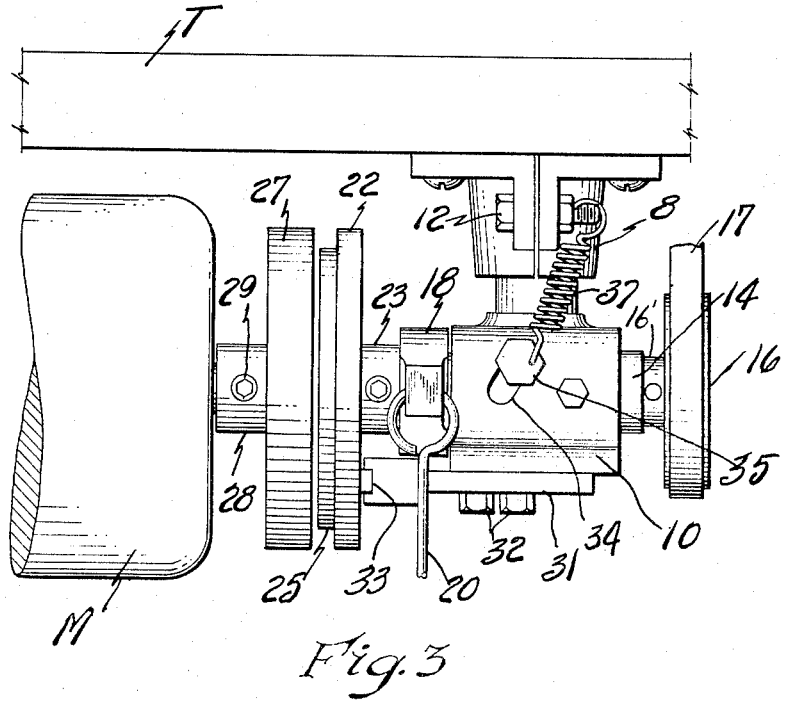
Fig. 3 is a view similar to Fig. 1 showing the mechanism in disengaged position.
Figure 2:
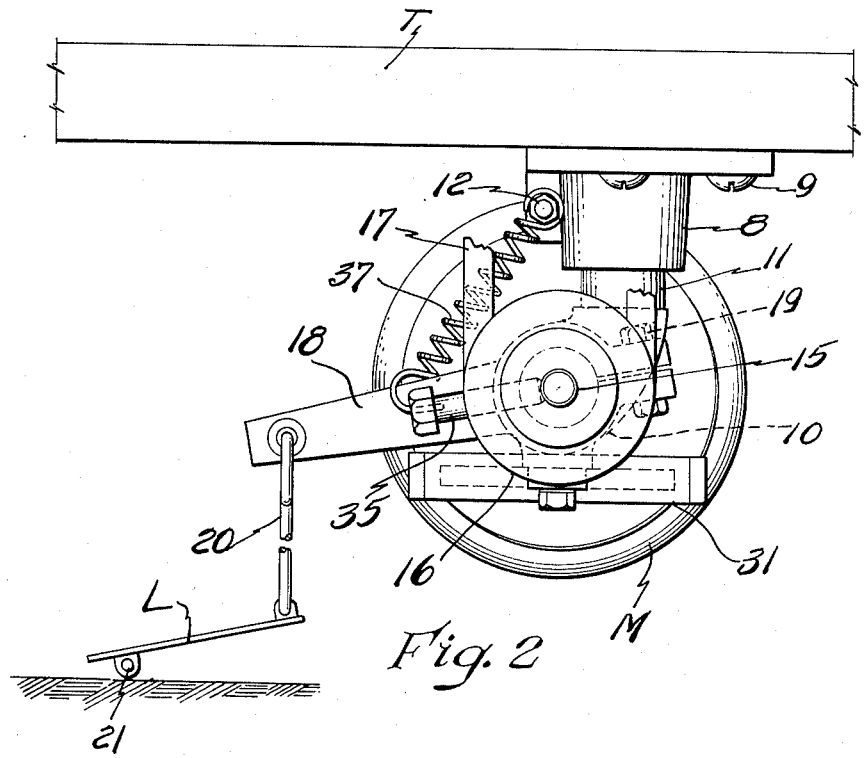
Fig. 2 is an end-elevational view thereof.
Figure 4:
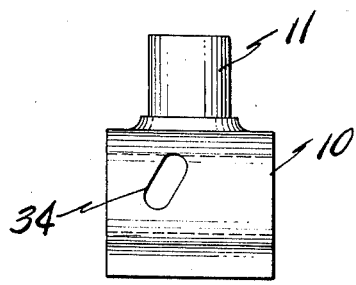
Fig. 4 is a detail, side-elevational view of the clutch supporting member.
Figure 5:
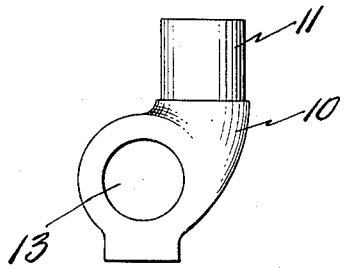
Fig. 5 is an end-elevational view thereof.

An angular slot 34 is provided on the supporting member 10, and a drive pin 35 extends therethrough and has threaded engagement with the sleeve member 14, a spring member 37 being connected to said drive pin, and to the bolt 12 respectively, so that there is a continuous tension to hold the mechanism in disengaged position as clearly shown in Fig. 3 of the drawings.

The operation of the machine is substantially as follows:

With the mechanism in disengaged position as shown in Fig. 3 of the drawings, the operator first depresses the treadle L which is pivotally connected to the floor or other support; this actuates the thrust arm, swinging the free end of the thrust arm downwardly and simultaneously moving the pin 35 from the top to the bottom of the angularly disposed slot 34, this movement shifts the sleeve 14 axially in the supporting members 10 forcing the clutch lining 25 into engagement with the lining provided on the motor drive plate, thereby driving the shaft 15 and with it the sheave 16 over which the belt 17 is trained.

To stop the mechanism, the operator raises his or her foot from the treadle, so that spring 37 forces the pin 35 upwardly in the angularly disposed slot 34, this swings the treadle and thrust arm upwardly and moves the sleeve 14 axially in the support 10 to force the clutch member to disengaged position, and the one face of the plate 22 into frictional engagement with the brake lining 33 thus quickly arresting the motion of the mechanism.

The angle of the slot 34 determines the axial travel of the sleeve, and the spring 14 exerts a continuous tension to pull the pin upwardly and the clutch 25 to disengaged position.

The mechanism is of sturdy, substantial design; the supporting means is adjustably suspended from the table, it can be easily mounted and demounted and requires but very little maintenance.

From the foregoing description, it will be clearly obvious that I have perfected a very simple, practical and inexpensive adjustable power transmitting mechanism for driving sewing machines and small industrial tools and the like.

What I claim is:

1. An adjustable power transmitting mechanism of the class described including, in combination, a table, a support, a clutch element supporting member mounted thereon, a sleeve journaled in said supporting member, a shaft rotatably mounted in said sleeve, an angularly disposed slot in said supporting member, a drive pin in said slot and anchored to said sleeve, a thrust arm on the sleeve adjacent said supporting member, a clutch plate on one end of the shaft, driving means in alignment with said shaft, a pulley secured to the other end of the shaft, said pulley and clutch plate holding the sleeve between them against relative axial movement and forming thrust surfaces for the sleeve, manually operable means for moving the thrust arm so as to axially shift said sleeve and the clutch plate into driving engagement with said driving means, and resilient means connected to said drive pin and support respectively for rotating said sleeve and shifting the clutch plate out of driving engagement with said driving means when the thrust arm is released.

2. An adjustable power transmitting mechanism including in combination, a table, a hub secured thereto, a clutch element supporting member mounted on said hub, a horizontally disposed sleeve rotatably mounted in said supporting member, an angularly disposed slot in said supporting member, and a pin mounted in said sleeve and projecting through said slot, a thrust arm fixedly mounted on said sleeve, a drive shaft journaled in said sleeve, a pulley on one end of said shaft, and a clutch plate on the opposite end thereof, said pulley and clutch plate holding the sleeve between them against relative axial movement and forming thrust surfaces for said sleeve, driving means in horizontal alignment with said shaft, manually operable means for moving the thrust arm so as to axially shift the clutch plate into driving engagement with the driving means, and resilient means connected to said pin and hub respectively for holding said shifting means in disengaged position when manually operable means is released.

3. An adjustable power transmitting mechanism of the class described including in combination, a table, a support secured to the underside of said table, a clutch supporting member carried by said support and having an angularly disposed slot therein, a sleeve journaled in said supporting member, a drive pin on said sleeve and projecting through said angularly disposed slot, a rotatable shaft in said sleeve, a thrust arm on one end of said sleeve, a clutch plate secured to one end of said shaft, driving means in alinement therewith, a pulley secured to the other end of said shaft, said pulley and clutch plate holding the sleeve between them against relative axial movement and forming thrust surfaces for said sleeve, manually operable means for axially shifting said sleeve and clutch plate into driving engagement with said driving means, resilient spring means connected to said drive pin and support for shifting said sleeve and clutch plate out of driving engagement with said driving means, a bracket secured to the lower face of the clutch supporting member and a brake member adjustably mounted on said bracket, said brake member being positioned to engage one face of the clutch plate when the manually operable means is released under the yielding action of said spring means to shift the mechanism to its disengaged position.

WALTER P. SCHULTZ.

REFERENCES CITED

The following references are of record in the file of this patent:

UNITED STATES PATENTS

| Number | Name | Date |
|---|---|---|
| 1,756,576 | Voight | Apr. 29, 1930 |
| 2,004,055 | Peets et al. | June 4, 1935 |
| 2,068,929 | Peets | Jan. 26, 1937 |